United States Patent [19]

Takahashi

[11] Patent Number: 4,761,728
[45] Date of Patent: Aug. 2, 1988

[54] HIGH VOLTAGE GENERATING DEVICE

[75] Inventor: Kazuyoshi Takahashi, Kawasaki, Japan

[73] Assignee: Canon Kabushiki Kaisha, Tokyo, Japan

[21] Appl. No.: 4,250

[22] Filed: Jan. 5, 1987

Related U.S. Application Data

[63] Continuation of Ser. No. 645,277, Aug. 22, 1984, abandoned.

[30] Foreign Application Priority Data

Sep. 2, 1983 [JP] Japan ................. 58-160547

[51] Int. Cl.$^4$ .................... H02M 3/335
[52] U.S. Cl. ................ 363/126; 363/21; 363/97; 336/90
[58] Field of Search ............ 363/126, 20, 21, 60, 363/61, 97; 336/90

[56] References Cited

U.S. PATENT DOCUMENTS

| | | | |
|---|---|---|---|
| 4,034,280 | 7/1977 | Cronin et al. | 363/97 X |
| 4,058,758 | 11/1977 | Peterson | 363/21 X |
| 4,122,514 | 10/1978 | Amin | 363/21 |
| 4,195,278 | 3/1980 | Doyle et al. | 336/90 |
| 4,253,136 | 2/1981 | Nanko | 363/21 |
| 4,327,404 | 4/1982 | Horiguchi | 363/97 X |
| 4,353,113 | 10/1982 | Billings | 363/21 |
| 4,447,866 | 5/1984 | Reeves | 363/21 |
| 4,510,562 | 4/1985 | Maeba | 363/97 X |

FOREIGN PATENT DOCUMENTS 58-116071  11/1983  Japan .................. 363/21

Primary Examiner—Philip H. Leung
Attorney, Agent, or Firm—Fitzpatrick, Cella, Harper and Scinto

[57] ABSTRACT

A high voltage generating device is provided with a high voltage transformer and a rectifying circuit which is connected to a terminal of the output coil of the high voltage transformer different from the high voltage output terminal of the output coil and which is incorporated in the unit of the high voltage transformer.

19 Claims, 4 Drawing Sheets

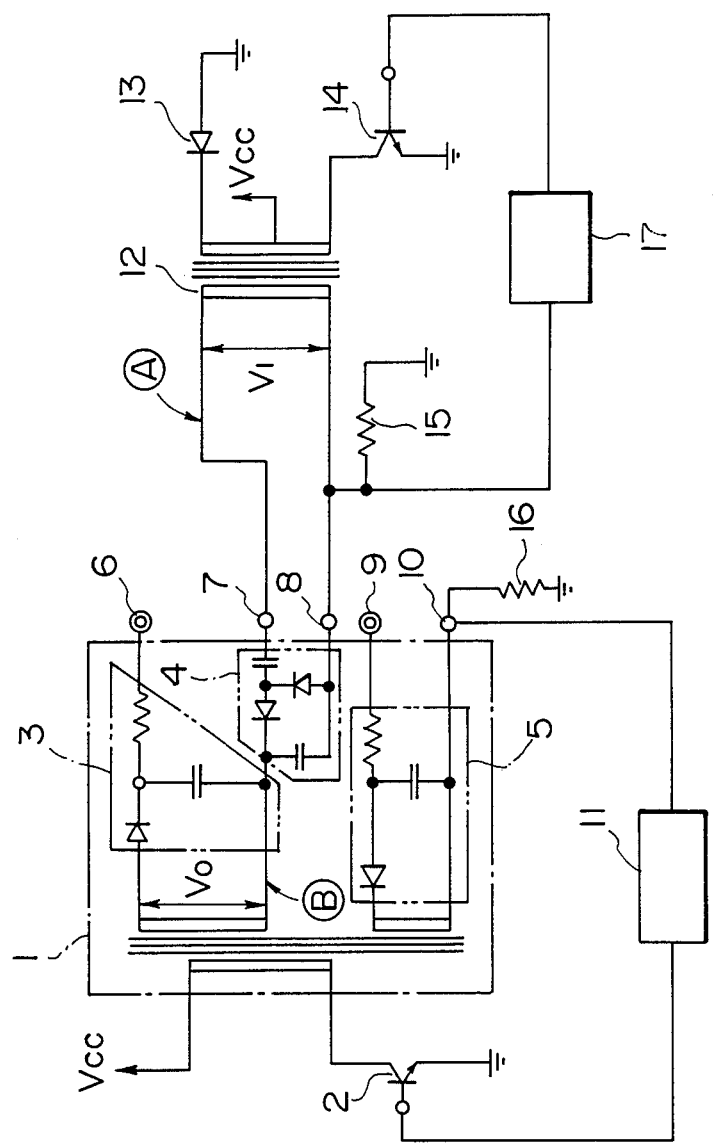
F I G. 3

HIGH VOLTAGE GENERATING DEVICE

This application is a continuation of application Ser. No. 643,277 filed 8/22/84 now abandoned.

BACKGROUND OF THE INVENTION

1. Field of the Invention

The present invention relates to a high voltage generating device for example for driving a charger in an electrophotographic apparatus.

2. Description of the Prior Art

Conventionally, such a high voltage generating device has a structure as shown in FIG. 1, wherein provided are a conventional high-voltage transformer T; a primary coil W1 thereof; a secondary output coil W2 thereof; a smoothing condenser C; a rectifying diode D; and a spark suppressing resistor R. The output high voltage V2 is equal to the sum of the output voltage V1 of the transformer itself and the voltage V3 of the other coil terminal.

In case of varying the voltage V3 in order to widen the variable range of said high output voltage V2 in such circuit, there is proposed a method of connecting the rectified output of a rectifying circuit RC as shown in FIG. 2 to the terminal of the voltage V3 of the transformer T and to modify the output of said rectifying circuit RC. In such case, however, the potential V3 is inevitably limited within a certain range due to the insulation or other conditions of said terminal or components or patterns relating thereto which are shown in FIG. 2. Also in case the rectifying circuit shown in FIG. 2 is formed, for example, on a printed circuit board, a relatively large circuit structure is inevitable in order to realize a high insulation voltage by a sufficiently large distances between the components.

On the other hand, in case of supplying different plural loads with high voltages, the use of the transformer and control switching element as shown in FIG. 1 for each load leads inevitably to a larger structure and a higher cost. It is therefore desirable to employ a transformer for providing high voltages to plural loads. In such an arrangement, however, independent control of the voltage supply is quite difficult because, in the common use of a transformer for plural loads, the control of a high voltage to be supplied to a load affects the high voltages supplied to other loads.

SUMMARY OF THE INVENTION

In consideration of the foregoing, an object of the present invention is to provide a compact high voltage generating device with improved high voltage insulation.

Another object of the present invention is to provide a high voltage generating device with a relatively wide variable range of the high voltage output.

Still another object of the present invention is to provide a high voltage generating device with an inexpensive and simple sturcture capable of providing plural loads with high voltages.

Still another object of the present invention is to provide a high voltage generating device capable of independently controlling high voltages to plural loads through the use of a common transformer.

The foregoing and still other object of the present invention, and the advantages thereof, will become fully apparent from the following description.

BRIEF DESCRIPTION OF THE DRAWINGS

FIG. 3 is a circuit diagram of an embodiment of the present invention;

DETAILED DESCRIPTION OF THE PREFERRED EMBODIMENTS

Now the present invention will be clarified in detail by embodiments thereof shown in the attached drawings.

Figure 1:
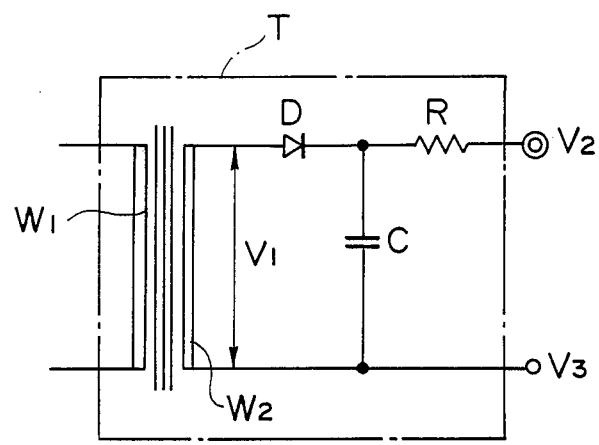
FIG. 1 is a circuit diagram of a conventional high voltage transformer.
Figure 2:
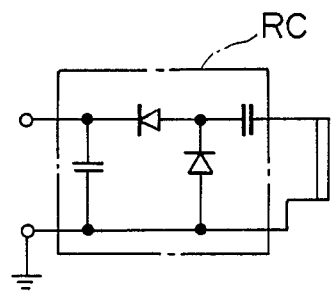
FIG. 2 is a circuit diagram of a rectifying circuit.
Figure 4:
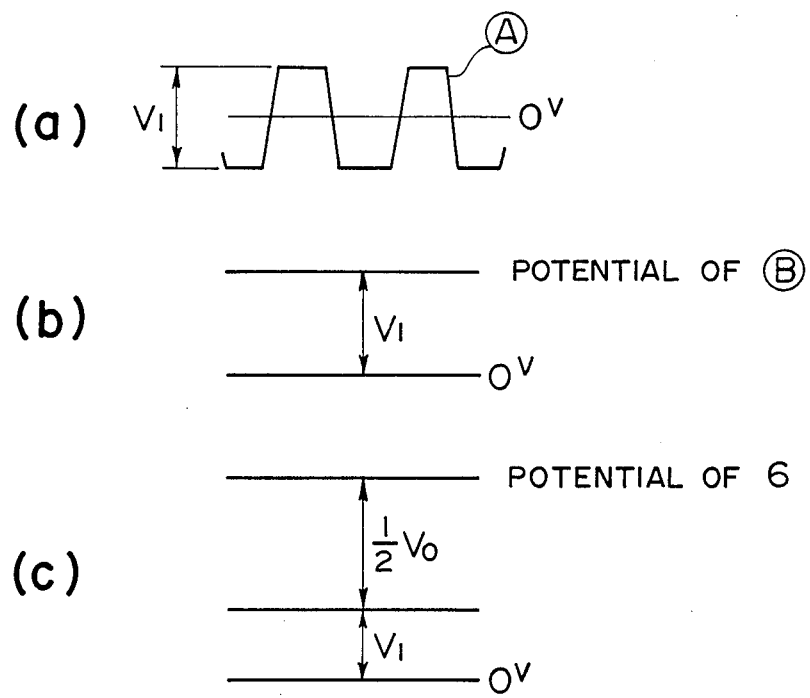
FIG. 4 is a voltage wave form chart showing voltage wave forms at various points of the circuit shown in FIG. 3.

FIGS. 3 and 4 are, respectively, a circuit diagram of an embodiment of the present invention and a wave form chart showing voltages at various points of said circuit. In FIG. 3 there are shown a two-output high voltage transformer 1 with two output coils; a switching transistor 2 for driving said high voltage transformer; rectifying circuits 3, 4, 5 provided in the high voltage transformer unit respectively for positive rectification, positive voltage doubling rectification and negative rectification; a positive high voltage output terminal 6 and a negative high voltage output terminal 9 which are respectively connected to a load requiring an independent control; transformer terminals 7, 8, 10; a constant current control circuit 11 for detecting the potential of said negative high voltage output terminal 9 by means of a sampling resistor 16 and turning on and off the switching transistor 2 in such a manner as to obtain a constant negative high voltage current from said terminal 9; a voltage elevating transformer 12 driven by the on-off operation of a switching transistor 14 to determine the potential of said terminal 7; a control circuit 17 for detecting the high voltage output current from said high voltage output terminal 6 by means of a sampling resistor 15 and controlling the on-off operation of said switching transistor 14 so as to obtain a constant high voltage current from said terminal 6; and a diode 13 for returning excessive energy in the transformer 12 to the power supply.

The output current of the transformer 12 is connected to the terminals 7, 8, then is rectified in the rectifying circuit 4 provided in the transformer 1, and is supplied to the output terminal of the transformer providing the positive high voltage.

The incorporation of the rectifying circuit 4 in the transformer unit enables a circuit formation without employing excessively large insulating distances among the components constituting said rectifying circuit. At the same time the variable output range of the high voltage output terminal 6 can be widened since the rectifying circuit 4 can operate over a wider voltage range.

FIG. 4 shows voltage forms at various points in the circuit shown in FIG. 3, wherein (a) represents the output wave form of the voltage elevating transformer 12 at a point A, (b) represents the output wave form at a point B obtained by rectifying the output of the transformer 12 with the rectifying circuit 4 with voltage doubling, and (c) represents the output voltage at the positive high voltage output terminal 6 obtained as the sum of the outputs of said transformer and said high voltage transformer 1.

Figure 5:
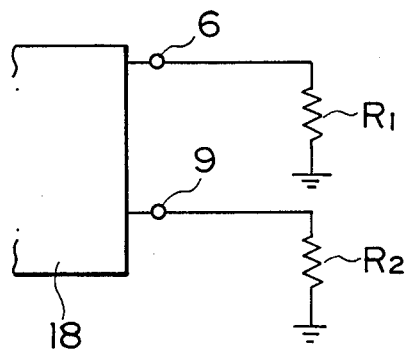
FIG. 5 is a circuit diagram showing load connection of the high voltage source shown in FIG. 3.

FIG. 5 shows the method of connection of loads to the high voltage source shown in FIG. 3, wherein the loads R1, R2, for example chargers in an electrophotographic apparatus, are connected between high voltage output terminals 6, 9 and the ground.

In the following there will be explained the function of the above-described circuit. The switching transistor 2 shown in FIG. 3 repeats the on-off operation to drive the high voltage transformer 1, thus generating high voltages between the terminals 6, 7 and between the terminals 9, 10. As shown in FIG. 5, loads R1, R2 are connected to the output terminals 6, 9 for high voltage supply. The corresponding currents are detected by the sampling resistors 15, 16 and are supplied to the constant current control circuits 11, 17.

Figure 7:
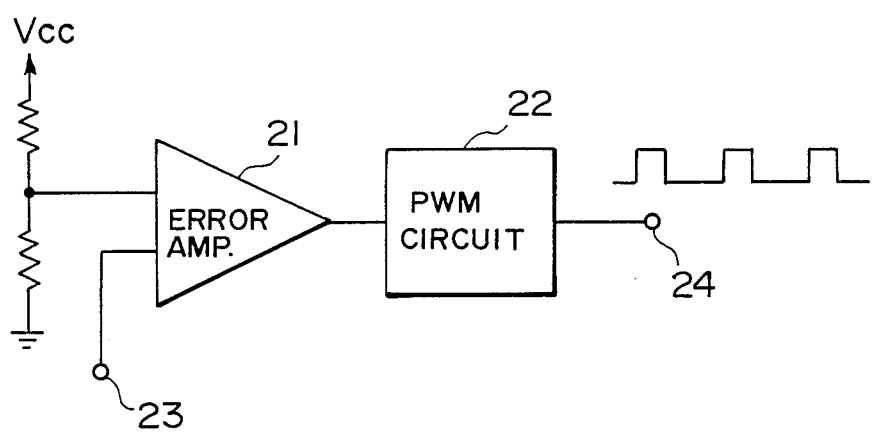
FIG. 7 is a circuit diagram showing an example of a constant current control circuit.

FIG. 7 shows an example of the constant current control circuits 11, 17, wherein shown are an error amplifier 21 and a pulse width modulation circuit 22. The value detected by the sampling resistor 17 or 16 is supplied to an input terminal of the error amplifier 21, while a reference value obtained by voltage division with resistors is given to the other input terminal, whereby the error amplifier 21 amplifies the error.

The pulse width modulation circuit 22 forms a pulse signal of a duty ratio corresponding to the output of the error amplifier 21, and said pulse signal is used for controlling the on-off operation of the aforementioned switching transistor 2 or 14.

The current from the negative high voltage output terminal 9 is detected by the sampling resistor 16, and the control circuit 11 controls the on-off operation of the switching transistor 2 according to the detected value to supply a constant current from the negative high voltage output terminal 9.

On the other hand, the current from the positive high voltage output terminal 6 is detected by the sampling resistor 15, and the control circuit 17 controls the on-off operation of the switching transistor 14 according to the detected value to supply a constant current from the positive high voltage output terminal 6. However the variable range of the output voltage from the above mentioned terminal 6 is determined by the variable range of the voltage elevating transformer 12.

In this manner plural loads can receive high voltage supplies not from respective exclusive transformers but from a common transformer, with the possibility of independent control of voltage supplied to plural loads. Consequently the present invention allows a reduction in the cost and the space required by the high voltage supply unit.

Figure 6:
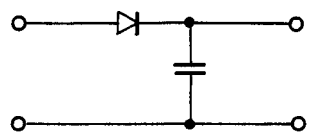
FIG. 6 is a circuit diagram of a single wave rectifying circuit in another embodiment.

In the foregoing embodiment the rectifying circuit 4 is composed of a voltage doubling rectifier, but it may also be composed of a single rectifier as shown in FIG. 6 or other various rectifying circuits.

As explained in the foregoing, the present invention allows one to make the high voltage supply unit compact by increasing the packing density of the transformer, and to improve the reliability by totally enclosing the high voltage generator within the high voltage transformer.

What is claimed is:

1. A high voltage generating device comprising:
a first transformer having a first output coil and a second output coil provided at an output side thereof for generating a boosted electric power at the output side in accordance with an electric power from an input side thereof;
a rectifying circuit coupled to a low voltage terminal of said first output coil for rectifying a voltage supplied thereto;
a housing unit for housing both the first transformer and the rectifying circuit;
a second transformer, an output coil of which is connected to the rectifying circuit, disposed outside the housing unit for supplying an AC voltage to the rectifying circuit via the output coil thereof such that the sum of the output electric power from the first transformer and the rectified voltage rectified by the rectifying circuit can be obtained at the first output coil of the first transformer, and
control means for controlling electric power supplied to an input coil of the second transformer in response to the output of the first output coil of the first transformer.

2. A high voltage generating device according to claim 1, wherein said first transformer is adapted to provide a DC high voltage output.

3. A high voltage generating device according to claim 1, wherein the voltage appearing at said high voltage output terminals depends on the voltage supplied to said rectifying circuit.

4. A high voltage generating device according to claim 1, further comprising a control circuit coupled to an output terminal of the second output coil for controlling electric power supplied to the input side of the first transformer in response to electric power generated at the output terminal of the second output coil of the first transformer.

5. A high voltage generating device comprising:
a transformer having a first output coil and a second output coil provided at an output side thereof for generating a boosted electric power at the output side in accordance with an electric power supplied from an input side thereof;
a first control circuit coupled to an output terminal of said first output coil for controlling the electric power supplied to the input side of said transformer in accordance with electric power generated at said output terminal of said first output coil of said transformer; and
a second control circuit coupled to an output terminal of said second output coil for controlling an increment and decrement of the electric power generated at said output terminal of said second output coil without controlling the electric power supplied from the input side of said transformer, said second control circuit including a rectifying circuit coupled to said output terminal of said second output coil, and a circuit for supplying an AC voltage to said rectifying circuit.

6. A high voltage generating device comprising:
a transformer having a first output coil and a second output coil provided at an output side thereof for generating an increased level of electric power at the output side in accordance with electric power from an input side thereof;
voltage output means coupled to one terminal of the first output coil for outputting a predetermined voltage to the first output coil such that a combined voltage of the electric power generated by the transformer and the predetermined voltage may be obtained at the other terminal of the first output coil; and stabilizing means for detecting the output of the first output coil and for stabilizing the output of the first output coil without affecting the output of the second output coil in response to the detected output.

7. A high voltage generating device according to claim 6, wherein said voltage output means includes an other transformer for outputting an AC voltage and rectifying means connected to an output coil of the other transformer for rectifying the AC voltage output from the other transformer.

8. A high voltage generating device according to claim 7, wherein said stabilizing means includes control means for controlling electric power supplied to the input coil of the other transformer in response to the detected output.

9. A high voltage generating device according to claim 6, further comprising another stabilizing means for detecting the output of the second output coil and in response thereto stabilizing the output of the second output coil.

10. A high voltage generating device according to claim 9, wherein said another stabilizing means includes control means for controlling electric power supplied to the input coil of the transformer in response to the detected output.

11. A high voltage generating device comprising:
a transformer having a first output coil and a second output coil provided at an output side thereof for generating an increased level of electric power at the output side in accordance with electric power from an input side thereof;
voltage output means coupled to one terminal of the first output coil for outputting a predetermined voltage to the first output coil such that a combined voltage of the electric power generated by the transformer and the predetermined voltage may be obtained at the other terminal of the first output coil;
first stabilizing means for detecting the output of the first output coil and for stabilizing the output of the first output coil in response to the detected output of the first output coil; and
second stabilizing means for detecting the output of the second output coil and for stabilizing the output of the second output coil in response to the detected output of the second output coil,
wherein said first and second stabilizing means stabilize the first and second output coils, respectively, independent of each other.

12. A high voltage generating device according to claim 11, wherein said voltage output means includes an other transformer for outputting an AC voltage and rectifying means connected to an output coil of the other transformer for rectifying the AC voltage output from the other transformer.

13. A high voltage generating device according to claim 12, wherein said first stabilizing means includes control means for controlling electric power supplied to the input coil of the other transformer in response to the detected output.

14. A high voltage generating device according to claim 11, wherein said second stabilizing means includes control means for controlling electric power supplied to the input coil of the transformer in response to the detected output.

15. A high voltage generating device comprising:
a transformer having a first output coil and a second output coil provided at an output side thereof for generating an increased level of electric power at the output side in accordance with electric power from an input side thereof;
voltage output means coupled to one terminal of the first output coil for outputting a predetermined voltage to the first output coil such that a combined voltage of the electric power generated by the transformer and the predetermined voltage may be obtained at the other terminal of the first output coils; and
stabilizing means for detecting the output of the second output coil and for stabilizing the output of the second output coil in response to the detected output.

16. A high voltage generating device according to claim 15, wherein said stabilizing means includes control means for controlling electric power supplied to the input coil of the transformer in response to the detected output.

17. A high voltage generating device according to claim 15, wherein said voltage output means includes an other transformer for outputting an AC voltage and rectifying means connected to an output coil of the other transformer for rectifying the AC voltage output from the other transformer.

18. A high voltage generating device according to claim 17, further comprising another stabilizing means for stabilizing the output of the first output coil by detecting the output of the first output coil and controlling said voltage output means in response to the detected output.

19. A high voltage generating device according to claim 18, wherein said stabilizing means includes control means for controlling electric power supplied to the input coil of the other transformer in response to the detected output.

* * * * *

UNITED STATES PATENT AND TRADEMARK OFFICE
CERTIFICATE OF CORRECTION

PATENT NO. : 4,761,728
DATED : August 2, 1988
INVENTOR(S) : Kazuyoshi Takahashi

It is certified that error appears in the above-identified patent and that said Letters Patent is hereby corrected as shown below:

On the title page, Item [63], "645,277" to read -- 643,277 --.

COLUMN 1

Line 32, change "Also" to read -- Also, --.

Line 36, change "distances" to --distance--;

Line 60, change "sturcture" to --structure--; and

Line 66, change "object" to --objects--.

COLUMN 2

Line 20, change "clarified" to --explained--.

COLUMN 3

Line 4, change "said transformer" to --said transformer 12--;

Line 24, change "sampling resistor 17 or 16" to --sampling resistors 15 or 16--; and Line 46, change "above" to --above- --.

UNITED STATES PATENT AND TRADEMARK OFFICE
CERTIFICATE OF CORRECTION

PATENT NO. : 4,761,728

DATED : August 2, 1988

INVENTOR(S) : Kazuyoshi Takahashi

It is certified that error appears in the above-identified patent and that said Letters Patent is hereby corrected as shown below:

COLUMN 5

Line 10, change "an" to --another--;

Line 11, delete "other";

Line 53, change "independent" to --independently--;

Line 55, change "an" to --another--.

COLUMN 6

Line 1, delete "other";

Line 27, change "coils" to --coil--;

Line 38, change "an" to --another--; and

Line 39, delete "other".

Signed and Sealed this

Eighteenth Day of July, 1989

*Attest:*

DONALD J. QUIGG

*Attesting Officer*      *Commissioner of Patents and Trademarks*